Patented Aug. 25, 1942

2,293,875

UNITED STATES PATENT OFFICE 2,293,875

AMINO COMPOUND

Eugene H. Woodruff, Kalamazoo, Mich., assignor to The Upjohn Company, Kalamazoo, Mich.

No Drawing. Application May 25, 1939, Serial No. 275,639

3 Claims. (Cl. 260—570.8)

This invention relates to improvements in amino compounds.

This invention relates to a new and useful product which is physiologically active for the treatment of asthma or the like. The product is particularly useful because it has a high bronchodilator effect with pressor activity so low that in therapeutic doses it is practically nil.

The objects of this invention are:

First, to produce a new and useful product.

Second, to produce such a product physiologically active as a therapeutic agent for treating asthma which has a very high bronchodilator effect and which has a practically negligible pressor effect.

Third, to provide such a substance of low toxicity.

Fourth, to produce such a product which may be administered orally.

Further objects and advantages will appear from the description to follow. The invention is pointed out in the claims.

My new product may be termed $\beta$-o-hydroxy phenyl-n-propylamine. Its structural formula is as follows:

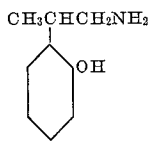

CH₃CHCH₂NH₂

Ethyl-($\beta$-methyl)-o-methoxy cinnamate is formed as follows: 75 grams (0.5 mole) of o-methoxy acetophenone, 100 grams (0.6 mole) ethyl bromacetate, 50 grams of zinc-copper alloy shavings (8 per cent copper) and 250 cc. of anhydrous benzene are placed in a one-liter round-bottomed flask equipped with a reflux condenser. The reactants are heated on a steam bath until a vigorous reaction sets in whereupon the heat is withdrawn until the violence has subsided. The solution is then refluxed an additional 45 minutes to complete the reaction.

After cooling the zinc complex is decomposed by adding a large excess of cold dilute sulfuric acid. The solution is then filtered with suction to remove any undissolved zinc and copper. The orange colored benzene solution is separated from the aqueous layer and dried over anhydrous magnesium sulfate.

The dried benzene solution is refluxed for 30 minutes with 30 cc. of phosphorous oxychloride in one-liter round-bottomed flask. The cooled deeply colored solution is washed twice with cold water to remove the phosphorous oxychloride and then dried over anhydrous magnesium sulfate. After removal of the solvent the product is distilled under reduced pressure. This product has a boiling point of 160° at 13 mm. of mercury. This yields 77 grams or 70 per cent of the theoretical.

o-Methoxy-$\beta$-methyl cinnamic acid is then formed from this product as follows:

110 grams (0.5 mole) of the ester is saponified by refluxing for two hours with 56 grams (1 mole) of potassium hydroxide made up to a 50 per cent solution, enough alcohol being added to completely dissolve the ester. After refluxing for two hours the solution is poured into two liters of water. The alcohol is removed under diminished pressure and the cooled alcohol-free solution extracted with ether to remove unsaponified material. After expelling the ether the solution is acidified with concentrated hydrochloric acid. The acid is extracted with ether, and after removal of the solvent distilled. This product has a boiling point of 191° at 13 mm. of mercury. This yields 68 grams or 70 per cent of the theoretical. The acid may be recrystallized from a benzene-petroleum ether mixture. A mixture of geometric isomers having a melting point of 76° is obtained.

$\beta$-(o-Methoxy phenyl) butyric acid is then produced from this product as follows:

192 grams (1.0 mole) of o-Methoxy-$\beta$-methyl cinnamic acid is added to two liters of 8 per cent sodium sulfate solution containing 20 grams of sodium hydroxide. The solution is reduced electrolytically using a mercury cathode and a sheet lead anode. An apparatus that may be used for amounts of this size is described in "Organic Synthesis," col. vol. I, p. 304, H. Gilman, editor. John Wiley & Sons, N. Y.

60.0 ampere hours are used for reduction, this being about 10 per cent in excess of the amount theoretically necessary. The solution in the cathode compartment is filtered and acidified with sulfuric acid. The acid separating is extracted with ether, the solution dried, and after removal of the solvent vacuum distilled. The product has a boiling point of 171° at 11 mm. mercury. Upon recrystallization from benzene-petroleum ether a solid melting point of 47° was obtained. This yields 171 grams or 88% of the theoretical.

$\beta$(o-Methoxy phenyl) butyryl chloride is then formed from this product as follows:

To 180 grams (1.5 mole) of thionyl chloride contained in one-liter round-bottomed flask equipped with a reflux condenser and an efficient gas absorption trap is dropped over ¾ hour 194 grams (1.0 mole) of β-(o-Methoxy phenyl) butyric acid. The flask is warmed gently on a steam bath during the addition of the acid and for one-half hour longer. The solution is transferred to a one-liter Claisen distilling flask and after removal of the excess thionyl chloride the β-(o-Methoxy phenyl) butyryl chloride is distilled under reduced pressure. This product has a boiling point of 135–140° at 12 mm. of mercury. This yields 184 grams or 86.8 per cent of the theoretical.

β-(o-Methoxy phenyl) butyramide is then formed from this product as follows:

1500 cc. of 27 per cent ammonia water is placed in a 5-liter three-necked flask equipped with a mechanical stirrer and cooled to +10° C. by means of an ice-salt mixture. To the ice cold ammonia 212 grams (1.0 mole) of β-(o-methoxy phenyl) butyryl chloride is added at such a rate as to keep the temperature of the solution at +10 to +15° C. Gaseous NH$_3$ is bubbled into the solution at the same time so as to keep the aqueous solution saturated with the gas during the reaction. The solution is stirred 30 minutes after the addition of the acid chloride and is then filtered with suction to remove the amide. The solid amide is washed several times with cold water and dried at 100° C. The yield is 174.0 grams or 90 per cent of the theoretical. The amide may be crystallized from benzene and has a melting point of 125–126° C.

β-o-Methoxy phenyl-n-propylamine is then produced from this product as follows:

In a 2-liter three-necked round-bottomed flask equipped with a thermometer and a mechanical stirrer is placed 80 grams of sodium hydroxide dissolved in 800 cc. of distilled water and 88 grams of liquid bromine. The solution is cooled to 15–20° C. and 96.5 grams (0.5 mole) β-(o-methoxy phenyl) butyramide ground to pass a 20 mesh sieve is dusted over the surface of the stirred solution as fast as it will dissolve.

When the amide is in solution, an air-cooled condenser is added and the solution warmed to 70° for one hour. Eighty grams of solid sodium hydroxide are added and the solution heated with stirring at 80° for one and one-half hours. Upon cooling the oil is extracted from the aqueous solution with ether, dried over anhydrous magnesium sulfate and on removal of the solvent vacuum distilled. This product has a boiling point of 122–124° at 10 mm. of mercury. This yields 55 grams or 66.6 per cent of the theoretical.

β-o-Hydroxy phenyl-n-propylamine is then formed from this product as follows:

8.25 grams (0.05 mole) of the methoxy amine and 45 cc. of 36 per cent hydrochloric acid are heated in a sealed tube at 160° C. for two hours. After cooling the tube is opened and the contents removed and cooled whereupon the hydrochloride of the hydroxy amine precipitates. The precipitate is filtered and dried. This product has a melting point of 165° C. This yields 7.7 grams or 80 per cent. Upon evaporation of the filtrate an additional 1.0 gram of material may be obtained. When further purified by crystallization from an absolute alcohol-ether mixture, the hydrochloride melts at 168–9° C.

This product may be administered orally. The product is very effective as a bronchodilator. Its pressor effect is 1/6600 that of epinephrine. Its bronchodilator effect is 1/20 to 1/25 that of epinephrine. Its toxicity is low. A dose of 110 mg. per kilo body weight will kill 50% of the rats to which it is administered.

In using the product for treating asthma or the like, the low pressor effect is particularly valuable. Side reactions such as nervousness, insomnia and heart disturbances are eliminated because the pressor effect is negligible in therapeutic doses. This product is particularly useful because the bronchodilator effect is of considerable duration. The effect lasts much longer than that of epinephrine.

Salts other than chloride may be employed. Salts of inorganic mineral acids such as sulfuric and phosphoric are satisfactory. Salts of organic carboxylic acids such as acetic acid may be employed. It is also possible to employ salts of oleic, stearic and palmitic acid.

The free amine may also be employed. This is obtained from the chloride by treating with ammonia in the recognized manner.

Having thus described my invention, what I claim as new and desire to secure by Letters Patent is:

1. A salt of β-o-hydroxy phenyl-n-propylamine having a pressor effect about 1/6600 that of epinephrine and a bronchodilator effect about 1/20 to 1/25 that of epinephrine, and having a low toxicity.

2. β-o-Hydroxyphenyl-n-propylamine having a having a pressor effect about 1/6600 that of epinephrine and a bronchodilator effect about 1/20 to 1/25 that of epinephrine, and having a low toxicity.

3. A salt of an acid selected from a group consisting of inorganic mineral acids, organic carboxylic acids and β-o-hydroxy phenyl-n-propylamine having a pressor effect about 1/6600 that of epinephrine and a bronchodilator effect about 1/20 to 1/25 that of epinephrine and having a low toxicity.

EUGENE H. WOODRUFF.